L. C. RICE.
MACHINE FOR RECOVERING ESSENTIAL OILS FROM CITRUS FRUITS.
APPLICATION FILED MAR. 13, 1919.
1,341,341.
Patented May 25, 1920.
3 SHEETS—SHEET 1.
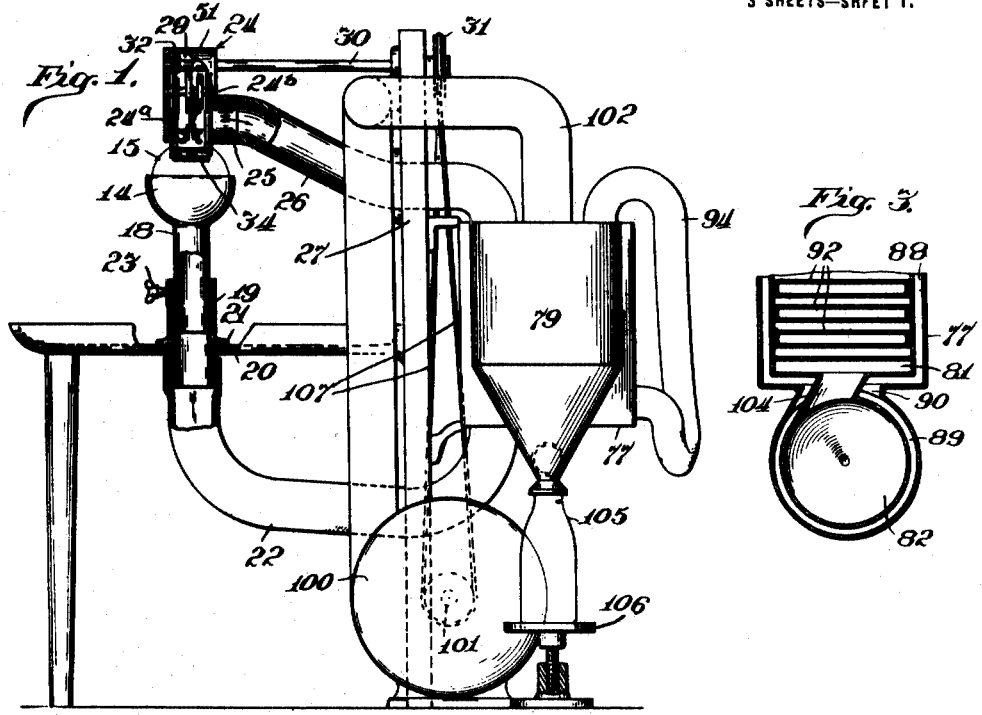
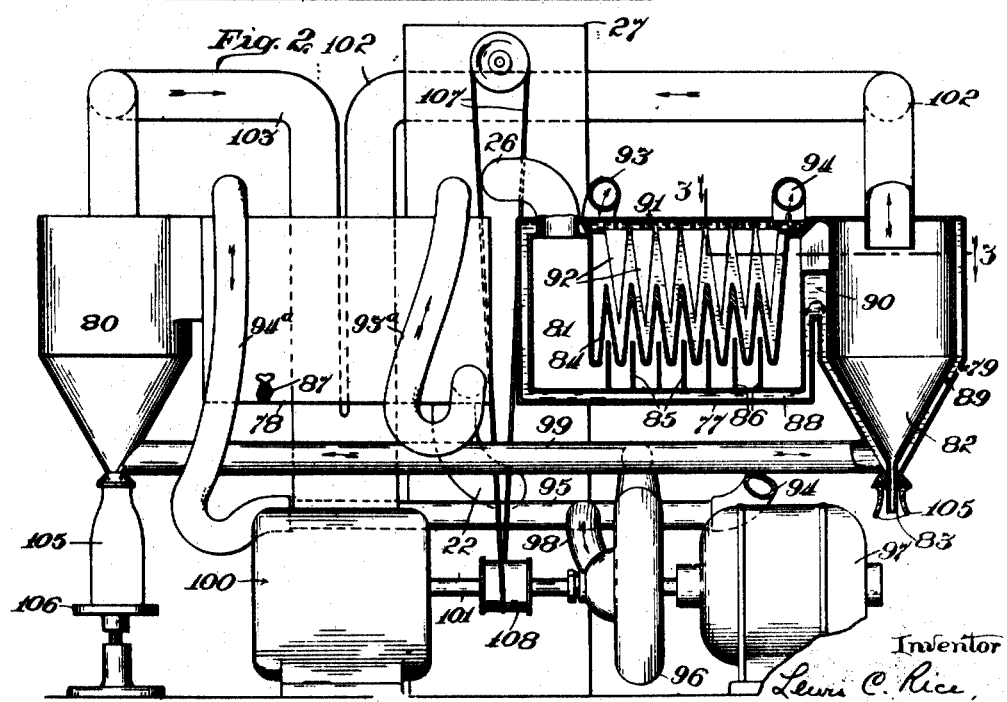

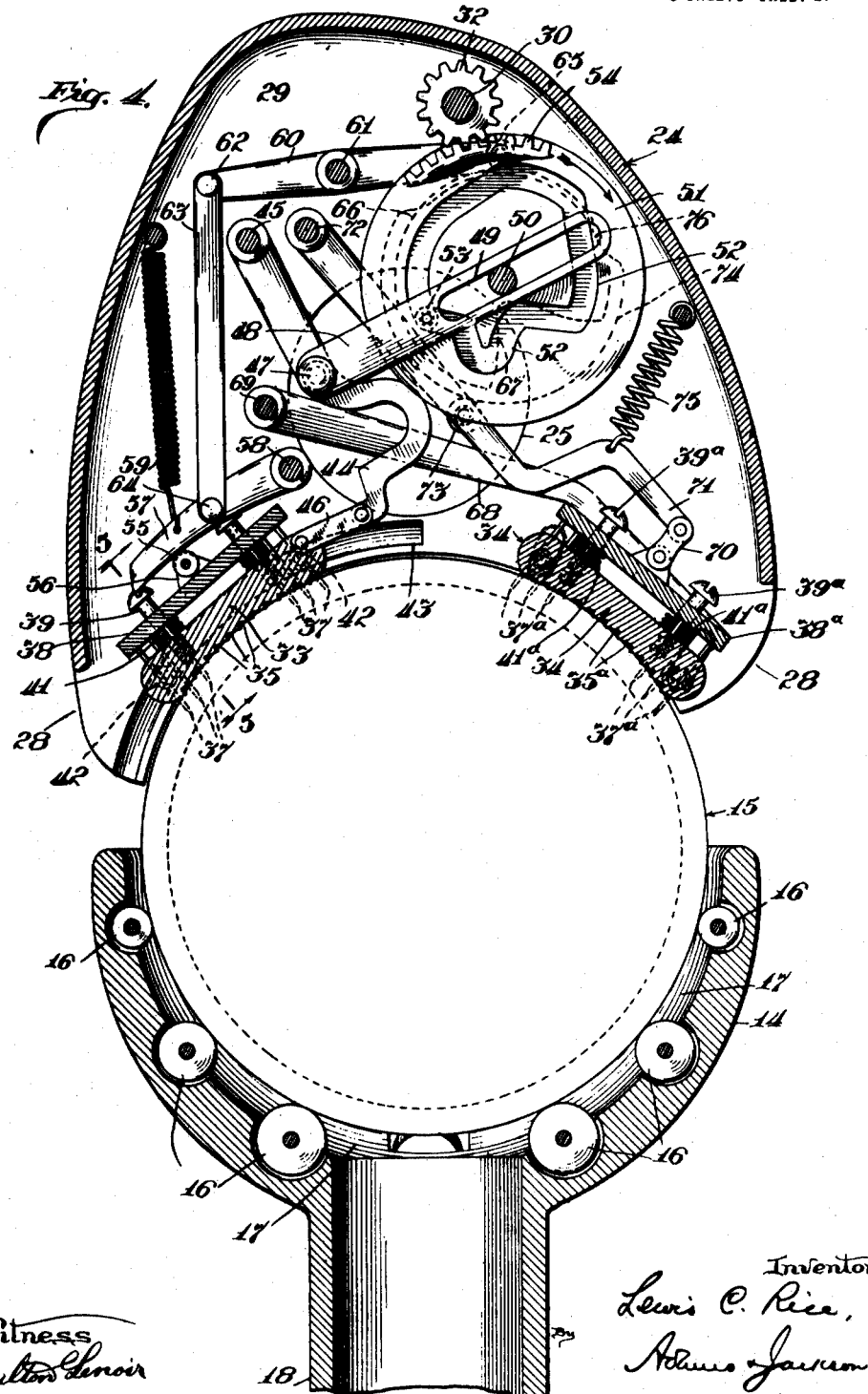

L. C. RICE.
MACHINE FOR RECOVERING ESSENTIAL OILS FROM CITRUS FRUITS.
APPLICATION FILED MAR. 13, 1919.

1,341,341.

Patented May 25, 1920.
3 SHEETS—SHEET 3.

Witness
Milton Lenoir

Inventor
Lewis C. Rice,
Adams Jackson
Attorneys

UNITED STATES PATENT OFFICE.

LEWIS C. RICE, OF FORT WAYNE, INDIANA.

MACHINE FOR RECOVERING ESSENTIAL OILS FROM CITRUS FRUITS.

1,341,341.  Specification of Letters Patent.  Patented May 25, 1920.

Application filed March 13, 1919. Serial No. 282,397.

*To all whom it may concern:*

Be it known that I, LEWIS C. RICE, a citizen of the United States, and a resident of Fort Wayne, in the county of Allen and State of Indiana, have invented certain new and useful Improvements in Machines for Recovering Essential Oils from Citrus Fruits, of which the following is a specification, reference being had to the accompanying drawings.

My invention has to do with the recovery of essential oils from citrus fruits, such as oranges, lemons, grape fruit, etc. This work, so far as I am aware, has heretofore always been done by hand, and the primary object of my invention is to provide a machine for doing it, thereby enabling it to be done more expeditiously, effectively, and economically than is possible by hand work. A more specific object of my invention is to provide for expressing the oils from such fruits without cutting up the fruit or injuring it so as to interfere with the economical use of the meat and fruit juices, my invention in this respect also being a radical departure from the prior practice according to which it was necessary to cut up the fruit before expressing the oils by hand. In the accompanying drawings I have illustrated one form in which my invention may be embodied, but it should be understood that the construction hereinafter described and illustrated in the drawings is merely illustrative of one form of machine which may be employed for the purpose, and that my invention is not limited to such construction, but, so far as the subject-matter of the generic claims hereinafter made are concerned, is of pioneer character.

In the accompanying drawings:

Figure 1 is an end elevation, partly in section, illustrating my improved machine;

Fig. 2 is a side elevation, some parts being in section;

Fig. 3 is a partial horizontal section on line 3—3 of Fig. 2;

Fig. 4 is an enlarged partial vertical section of the expressing devices;

Figure 9:
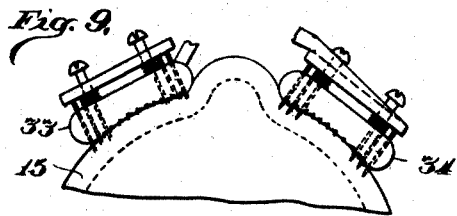
Figs. 9 to 13, inclusive, are views showing different stages of the operation of the machine.
Figure 10:
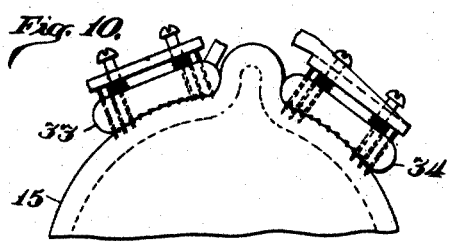

My improved machine comprises two principal instrumentalities, to-wit., means for expressing the oils from the fruit, and means for recovering the oils so expressed. More specifically stated, the first of these instrumentalities comprises means for supporting the fruit in such manner that it may be rotated so as to present different portions of its surface to the action of the expressing devices, and expressing devices which act to circumferentially compress the rind so as to cause it to buckle outwardly, and then squeeze the buckled portion so that the oils contained in it will be expressed. The latter stage is illustrated in Fig. 10. As a preliminary step in the latter operation, however, it is advisable that the expressing devices be first given a partial stroke similar to the expressing stroke in order to limber the rind somewhat, and minimize the danger of cracking it on the full stroke. After the preliminary or partial compressing stroke, the expressing devices relax to permit the fruit to assume its normal condition before the full compressing stroke is made. The position of the parts before the relaxation of the preliminary stroke is shown in Fig. 9. After the expressing stroke the fruit is relieved from the action of the compressing devices, and is then partially rotated to bring a fresh portion of the surface into position to be acted upon, after which the expressing operation is repeated. This continues until an entire zone of the fruit has been operated upon, when its position is shifted to present a fresh zone to the action of the expressing devices, and so on until the entire surface of the fruit has been treated. Incidentally to the expressing operation the surface of the fruit is slightly rasped to facilitate the expulsion of the oil, and the rind is punctured to a greater or less extent for the same purpose. The puncturing devices also serve as means for gripping the fruit to facilitate its rotation and to prevent the expressing devices from slipping upon it during their compressing stroke.

The devices for recovering the expressed oil comprise means for directing air currents over and around the fruit during the expressing operation, in connection with means for conducting the oil laden air to suitable apparatus by which it is cooled and condensed, after which it is discharged into suitable receptacles, such as bottles, placed to receive it.

Coming now to a detailed description of the embodiment of my invention illustrated in the drawings, I shall describe first the construction and operation of the expressing devices, which are best illustrated in assembled relation in Fig. 4. As shown in said figure, 14 indicates a suction cup which is of suitable shape to receive the fruit 15 which, for descriptive purposes, will be assumed to be an orange. The cup 14 is substantially hemispherical, as shown, and is preferably provided with a number of anti-friction rollers 16 distributed generally over its inner face so as to permit the orange to rotate freely, and also provide a narrow space 17 between the orange and the inside of the cup for the passage of a stream of air. The cup 14 is provided at its lower side with a tubular stem 18 through which the oil laden air passes down on its way to the condensing apparatus. This stem also provides means for adjustably supporting the cup so that it can be raised or lowered, as for the introduction and removal of the fruit. In Fig. 1, I have illustrated the stem 18 as being fitted in a tubular standard 19 mounted upon a table 20, on which piles of fruit may be placed, said stem being provided with an intermediate circumferential flange 21 which rests upon the table and is secured thereto. The lower end of the standard 19 extends below the table and provides a connection for the attachment thereto of a pipe 22 which leads to the condensing apparatus. Any suitable means, such as a thumb screw 23, may be employed for securing the stem 18 in its different positions of adjustment.

24 indicates a housing which overlies the cup 14 and incloses and supports the operating parts of the expressing devices. This housing may be mounted in any suitable way, as by providing it with a lateral tubular projection 25 which telescopes into a suction tube 26, as shown in Fig. 1. The tube 26 is itself supported by a vertical standard 27 through which it passes, as shown in said figure. The side portions of the housing are provided with openings 28 at their lower margins, as shown in Fig. 4, so that when suction is applied to the tube 26, a current of air flows inwardly through the opening 28 and through the housing 24 to the tube 25. As will be hereinafter explained, the oil expressed from the fruit is discharged into the chamber 29 formed by the housing, and the current of air passing through said chamber carries the liberated oil away through the pipe or flue 26.

30 indicates a shaft which extends through one wall of the housing 24 into the chamber 29, as shown in Fig. 4, and is mounted on the standard 27, as shown in Fig. 1. The outer end of the shaft 30 carries a pulley 31, by which it is driven, and at its inner end said shaft is provided with a pinion 32 for driving the expressing devices hereinafter described.

Figure 5:
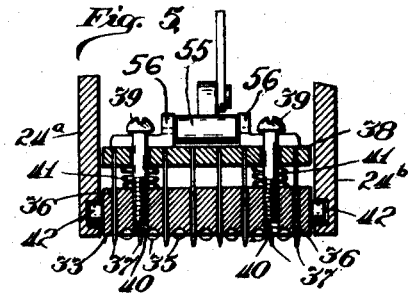
Fig. 5 is a partial cross section on line 5—5 of Fig. 4, illustrating the construction of one of the presser feet.
Figure 6:
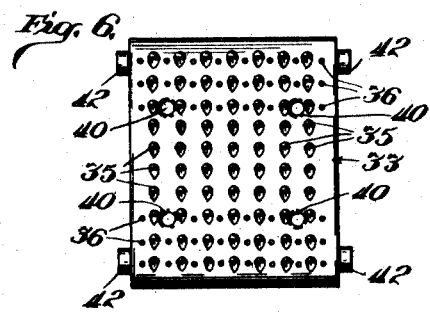
Fig. 6 is an under-side view of the foot shown in Fig. 5.

33—34 indicate presser feet which engage the fruit, and by which the expressing of the oil is accomplished. These presser feet are in many respects alike, although they differ in some particulars which will be hereinafter pointed out. The presser foot 33 is shown in Fig. 5, in which it will be seen that it is provided on its under face with a series of rasp teeth 35 arranged in checkered form over practically its entire surface, and is also provided with a number of fine perforations 36, in the illustration these perforations being arranged in three rows near the opposite ends of the presser foot. Extending through the perforations 36 are a number of needles 37, the upper ends of which are secured to a plate 38 similar in shape to the body or lower portion of the presser foot and arranged over the same, as shown in Fig. 5. The plate 38 is movably connected with the body of the presser foot by screws 39, preferably four in number, which fit loosely in perforations in the plate 38 and are screwed into sockets 40 in the presser foot, as shown in Fig. 6. Springs 41 are mounted on the screws 39 between the plate 38 and the body, and tend to hold the two members apart, thereby retracting the needles 37. Obviously when the plate 38 is pressed down upon the body of the presser foot, the springs 41 are compressed and the needles 37 are projected a considerable distance below the lower surface of the presser foot. By adjusting the screws 39 the normal position of the two members of the presser foot with relation to each other may be adjusted. 42 indicates pins which project laterally beyond the side margins of the main portion of the presser foot 33, as shown in Figs. 5 and 6. As thus far described, the two presser feet 33—34 are alike.

The pins 42 of the presser foot 33 project into arcuate slots or grooves 43 in the side walls 24ᵃ—24ᵇ of the housing 24 near the lower edges thereof, as shown in Figs. 4 and 5, and therefore by moving said presser foot endwise it will travel in a curved path within the limits fixed by the length of the grooves 43. As the lower margins of the side members 24ᵃ—24ᵇ of the housing conform approximately to the curvature of the upper surface of the fruit, it will be apparent that by projecting the needles of said presser foot into engagement with the rind, and then moving the presser foot endwise, the fruit may be rotated if it is not held against rotation, or if it be held against rotation, its rind may be compressed circumferentially or caused to buckle. Said presser foot is moved back and forth as may be required in the operation of the machine by means of a swinging arm 44 mounted at its upper end upon a pivot 45 carried by the housing 24, the lower end of said arm being connected to the inner end portion of the presser foot by one or more links 46. Said arm is connected intermediately of the length thereof by a pivot 47 with a bar 48 having a longitudinal slot 49 through which extends a cam supporting shaft 50, shown in Fig. 4. This shaft carries a cam 51 having a groove 52, in which travels a roller 53 carried by the bar 48, as shown in dotted lines in said figure. The shape of the cam groove 52 determines the character of the swinging movement imparted to the arm 44, and therefore controls the movement of the presser foot 33. The normal position of said presser foot, i. e., its position at the time it begins to operate on the fruit, is shown in Fig. 4, and the shape of the cam groove 52 is such that as said cam rotates in a clockwise direction, as indicated by the arrow in said figure, the presser foot 33 will be moved a half stroke to its normal right, then back substantially to its normal position, then a full stroke to the right, then back a short distance to the left of its normal position, and then back to its normal position. The purpose of these several movements will be more fully explained later. For the purpose of rotating the cam 51, the cam shaft 50 is provided with a gear 54, which meshes with the pinion 32, as shown in Fig. 4, so that said cam is rotated by the shaft 30.

Figure 11:
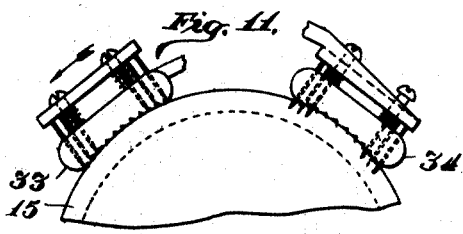
Figure 12:
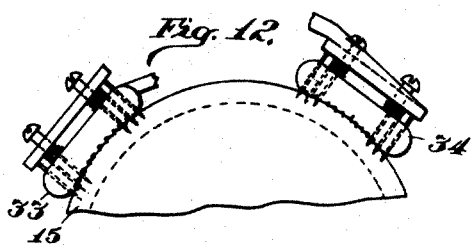
Figure 13:
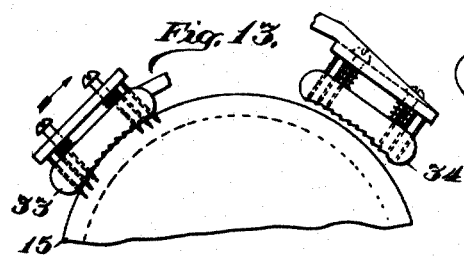
Figure 7:
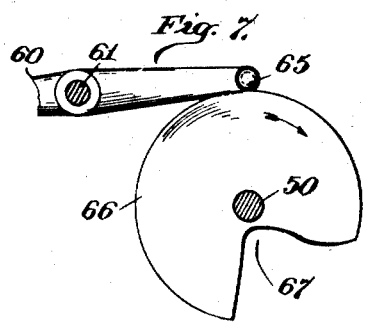
Fig. 7 is a fragmentary view showing a cam which operates one of the presser feet and a part of a lever which coöperates therewith.

During the several movements of the presser foot 33 its needles 37 are projected or retracted as required during different stages of the operation of the device by mechanism which will now be described. 55 indicates a roller carried by the plate 38 of the presser foot 33, being mounted between suitable brackets 56, as shown in Figs. 4 and 5. 57 indicates a swinging arm which is mounted upon a pivot 58 carried by the side walls 24ª—24ᵇ of the housing. The arm 57 extends over the path of the presser foot 33, and when in its operative position is adapted to engage and bear down upon the roller 55, thereby pressing the plate 38 down upon the body of the presser foot, and causing the needles 37 to project, as illustrated in dotted lines in Fig. 4. 59 indicates a spring which tends to move the arm 57 upward, or away from the presser foot. 60 indicates a rocking lever fulcrumed intermediately upon a shaft 61, shown in Fig. 4, and having one end connected by a pivot 62 with a thrust bar 63, the lower end of which is connected by a pivot 64 with the arm 57 intermediately thereof, as shown in said figure. Thus by rocking the lever 60 in a counter-clockwise direction as viewed in Fig. 4, the arm 57 may be pressed down upon the roller 55 against the tension of the spring 59, thereby projecting the needles 37. The opposite end of the lever 60 carries a roller 65 which rotates on the periphery of a cam 66, also carried by the shaft 50. This cam is provided with a pronounced depression 67, as shown in Fig. 7, and operates to hold the arm 57 in operative position at all times except when the roller 65 reaches the depression 67, which permits the spring 59 to raise the arm 57 and rock the lever 60 in a clockwise direction so that the roller 65 follows the depressed margin of the cam. The cam 66 is so arranged with reference to the cam groove 52, the lever 60, and the slotted bar 48, that the arm 57 is out of operative position only while the presser foot 33 is moving to the left from its normal position as viewed in Fig. 4, as indicated by the arrow in Fig. 11, which shows the presser foot 33 at the beginning of its movement to the left from its normal position. When the presser foot reaches the extreme limit of its movement to the left, the arm 57 returns to its operative position and again projects the needles 37 into engagement with the fruit, as shown in Figs. 12 and 13.

Figure 8:
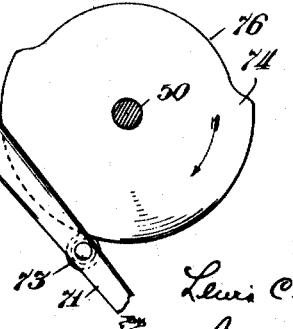
Fig. 8 is a similar view showing a cam which operates the other foot and a part of a lever which coöperates therewith.

The presser foot 34 has no endwise movement, but is movable substantially radially toward and from the fruit; for this purpose the laterally projecting pins of said presser foot being fitted in substantially radial slots in the side members 24ª—24ᵇ of the housing. Said presser foot is supported and held against endwise movement by a swinging arm 68 mounted upon a pivot 69, as shown in Fig. 4, and secured to the plate 38ª of said presser foot. For moving the latter plate toward and from the body portion of the presser foot 34, it is connected by links 70 with a swinging arm or lever 71, pivoted at 72, and provided with a roller 73 which rides on the periphery of a cam 74, also carried by the shaft 50, as shown in Figs. 4 and 8. A spring 75 exerts upward or outward pull on the lever 71, and tends to move the plate 38ª away from the body portion of the presser foot 34, and when said plate engages the heads of the screws 39ª, tends to lift the presser foot 34 out of engagement with the fruit, as illustrated in Fig. 13. When this occurs, as will be understood, the needles 37ª of the preser foot 34 are retracted out of engagement with the fruit. The shape of the cam 74 is illustrated in Fig. 8, from which it will be seen that it is provided with a depressed portion or valley 76 which, in the illustrated construction, comprehends about a third of its circumference, and the arrangement is such that the roller 73 rides on the valley portion of the cam, and consequently the needles 37ª of the presser foot 34 are out of engagement with the fruit, during the time when the presser foot 33 is moving from its position at the extreme left back to its normal position.

The operation of the parts thus far described is as follows: When the cup 14 is moved up manually or in any other suitable manner to carry the fruit into engagement with the presser feet 33—34, said presser feet are respectively in their normal positions shown in Fig. 4, the needles 37—37ª of said presser feet being then projected so that they penetrate the rind of the fruit. The presser foot 34 retains this position, but the rotation of the shaft 50 moves the presser foot 33 endwise to the right, the cam groove 52 giving it at first a half stroke so that the parts then assume the position shown in Fig. 9. The presser foot 33 is then moved back to its normal position, its needles, however, remaining projected so that it does not change its relation to the fruit. As the cam 51 continues to rotate, the presser foot 33 is then given a full stroke to the right so that the parts assume the position shown in Fig. 10. The half stroke described flexes the rind somewhat, and limbers it up so that when it is pinched or compressed circumferentially on the succeeding full stroke, as shown in Fig. 10, it is not apt to crack. This compressing or pinching operation expels the oil from the rind so that it flies out into the chamber 29 and is taken by the current of air flowing therethrough and carried off to be recovered as hereinafter described. When the presser foot 33 is returned to its normal position as described, the cam 66 comes into action and moves the arm 57 out of operative position, permitting the springs 41 to withdraw the needles 37 out of engagement with the fruit, which is accomplished quickly owing to the steep pitch of the valley 67 of the cam 66. The presser foot 33 is then moved to the left from its normal position, its teeth 35 rasping the surface of the fruit so that the oil cells are more or less ruptured as the presser foot moves back over the fruit. When the presser foot reaches the limit of its movement to the left, the lever 60 operates to move the arm 57 down into operative position, again projecting the needles 37 into engagement with the fruit. During all this time the lever 71 will have held the presser foot 34 and its needles 37ª in engagement with the fruit, owing to the contour of the cam 74. When, however, the presser foot 33 reaches the limit of its movement to the left, the lever 71 operates to move the presser foot 34 and its needles out of engagement with the rind so that the fruit is then free to be rotated when the presser foot 33 is moved to the right to its normal position, which operation is then effected by the cam groove 52. This sequence of operations is continued until a complete zone of the fruit has been operated upon, after which the position of the fruit is shifted to bring a fresh zone into position, and the operation continued. The perforation of the rind accomplished by the needles aids in liberating the oil, and as the pressure applied to the rind is exerted circumferentially, the meat will not be injured or the juices liberated, so that the fruit is left in good condition for other uses.

The hemispherical cup shown is designed more particularly for spherical fruit, such as oranges and grape fruit, but it may be used also for lemons and similar fruit, although if desired, an appropriately shaped cup may be used for the latter.

The apparatus for recovering the expressed oils is best shown in Figs. 1, 2 and 3, and comprises means for cooling the oil laden air, and means for separating the oil from the air. In connection therewith I also provide means for creating the air currents employed to carry off the oil from the expressing devices. As has been explained, I employ two currents of air, one passing over the fruit through the chamber 29, and the other passing down around the fruit through the cup 14, and I prefer to provide separate cooling and separating devices for the oil carried by these two currents, although that is not essential as both air currents may be conducted to the same separating and cooling devices. In the illustrated construction, 77—78 indicate two cooling tanks, and 79—80 two separators connected with the cooling tanks 77—78, respectively. It will be necessary to describe only one of these tanks and separators in detail, as they are alike. Referring particularly to Fig. 2, the tank 77 contains a receptacle 81, which at one end communicates with the pipe 26 leading from the expressing chamber 29, and at the other end communicates tangentially with a separating receptacle 82, the upper portion of which is cylindrical in form, while its lower portion is conical, and is provided with a discharge pipe 83. The intermediate portion of the receptacle 81 is in the form of a tortuous passage formed at one side by a zig-zag wall 84, and at the other side by baffle plates 85 secured to the bottom of the receptacle and extending up into the recesses of the zig-zag wall 84. These baffle plates are provided at or near their lower edges with perforations 86 to permit any condensed oil deposited in the receptacle 81 to flow along the bottom thereof, which may be slightly inclined to facilitate such flow. A cock 87 may be provided at a convenient point to draw off such separated oil. Between the receptacle 81 and the tank 77 is a space or chamber 88 adapted to contain water for cooling purposes, and in like manner a similar space 89 is provided between the separator tank 79 and the receptacle 82 therein, the chambers 88—89 being in communication with each other, as shown at 90 in Fig. 2. 91 indicates a cover for the tank 77 which is provided with a series of baffle plates 92 which project down into the recesses of the zig zag wall 84, thus providing a tortuous passage for the water flowing through the tank 77 above the receptacle 81. 93 indicates a water supply pipe which connects with the cover 91 adjacent to one end thereof, and may be an ordinary hose pipe, and 94 indicates a similar outlet pipe which is connected with the opposite end of said cover. The pipe 93 is also connected with the chamber 88, as illustrated by the corresponding part 93ª of tank 78 in Fig. 2. The pipe 94 is connected with a return pipe 95 which connects with a centrifugal or other suitable pump 96 driven by an electric or other suitable motor 97. 98 indicates the connection between the pipe 95 and the intake of the pump 96. As will be observed at the left in Fig. 2, the tank 78 is provided with a pipe 94ª which corresponds with the pipe 94, and is also connected with the pipe 95. 99 indicates a pipe connected with the discharge side of the pump 96 which leads to the chamber 89 of the separator 79 and also to the corresponding chamber of the separator 80. While I have shown this pipe as leading directly to said chambers, I wish it to be understood that if desired, any suitable means for cooling the water may be interposed, so that the water caused to circulate through the apparatus may be kept at a low temperature in hot weather. Thus when the pump 96 is in operation, and the covers of the tanks 77—78 are in place, water will circulate around the separator receptacles 82 of both separators, and will then flow through the chambers 88 of the tanks 77—78, and also through said tanks above the receptacles 81 therein, being admitted to the upper portion of said chambers by the pipes 93—93ª, returning to the pump through pipes 94—94ª. The oil laden air in the receptacles 81, therefore, is subjected to the cooling action of the water, and more or less of the oil will be deposited in the receptacles 81, depending upon the degree of saturation of the air. The oil laden air is caused to flow through the receptacles 81 by means of a suction fan 100, also driven from the motor 97 by means of a shaft 101, said fan being connected by pipes 102—103 with the upper portions of the separator receptacles 82, as shown in Fig. 2. The pipe 26 leading from the expressing chamber 29 is connected with the receptacles 81, as has been pointed out, and the pipe 22 leading from the cup 14 is connected with the lower portion of the corresponding receptacle contained in tank 78, as shown in Fig. 2. Consequently the pull of the fan 100 creates currents of air from the receptacles 82 through the receptacles 81 and through the pipes 26—22, causing the oil laden air to flow in the manner already indicated. As the air enters the receptacles 82 tangentially, as illustrated at 104 in Fig. 3, by centrifugal action the oil will be separated from the air and will pass to the lower portion of said receptacles, to be discharged through the pipe 83 into a bottle 105 or other container placed to receive it. The pipe 83 is provided with a suitable valve so that the oil may be drawn off when desired. Preferably an adjustable stand 106 is provided under each separator to support the bottles 105.

The shaft 30 which operates the expressing devices is driven by a belt 107 which runs on the pulley 31 and is driven by a pulley 108 carried by the shaft 101, as shown in Fig. 2, so that all the operating parts are driven by the motor 97.

The operation of the expressing device has already been fully described, and it is believed that the operation of the condensing and recovering devices will be readily understood from the foregoing description thereof. It will be evident, therefore, that I have provided an apparatus by which the essential oils of citrus fruits may be quickly and economically expressed without damaging the fruit so as to unfit it for other uses, and by which the expressed oils may be recovered and collected in suitable containers. An important advantage of an apparatus such as that described is that it makes it possible to do the work in the day time and in hot weather. This advantage will be appreciated when it is considered that owing to the prevalent warm weather in citrus fruit producing countries or districts, it heretofore has been necessary, when working by hand, to do the expressing at night when it is cool in order to prevent loss through evaporation. This not only adds to the difficulty of doing the work, but also increases the expense for labor, lights, etc. Also it is more desirable to work on the fruit when it is warm, as the oils are then more easily expressed.

While the apparatus described is designed primarily for operating on citrus fruits, it may be employed for any other purpose for which it is adapted.

What I claim as my invention and desire to secure by Letters Patent, is:—

1. A machine for recovering oils from citrus fruits, comprising means for supporting the whole fruit, and means for expressing oil from the rind thereof.

2. A machine for recovering oils from citrus fruits, comprising means for supporting the whole fruit, and means for circumferentially compressing the fruit to expel oil from the rind thereof.

3. A machine for recovering oils from citrus fruits, comprising means for supporting the whole fruit, and means for buckling the rind thereof to express oil therefrom.

4. A machine for recovering oils from citrus fruits, comprising means engaging the outer surface of the whole fruit and operating to express oil from the rind thereof.

5. A machine for recovering oils from citrus fruits, comprising means engaging the outer surface of the whole fruit and operating to circumferentially compress the same to express oil from the rind thereof.

6. A machine for recovering oils from citrus fruits, comprising means for supporting the whole fruit, and means for progressively expressing oil from different portions of the rind thereof.

7. A machine for recovering oils from citrus fruits, comprising means for expressing oil from the rind thereof and for rotating the fruit.

8. A machine for recovering oils from citrus fruits, comprising means for expressing oil from the rind of the fruit, and means for actuating said expressing means to rotate the fruit.

9. A machine for recovering oils from citrus fruits, comprising means for supporting the fruit, expressing devices for expressing oil from the rind thereof, and means for actuating said expressing devices to first partially compress the rind and then more fully compress the same.

10. A machine for recovering oils from citrus fruits, comprising expressing devices adapted to engage the rind, means for actuating said expressing devices to circumferentially compress the rind, and means for adjusting the position of said devices with relation to the surface of the fruit.

11. A machine for recovering oils from citrus fruits, comprising means for puncturing the rind, and means for expressing the oil therefrom.

12. A machine for recovering oils from citrus fruits, comprising means for rasping the surface of the rind, and means for expressing the oil therefrom.

13. A machine for recovering oils from citrus fruits, comprising means for puncturing the rind, means for rasping the surface of the rind, and means for expressing oil from the rind.

14. A machine for recovering oils from citrus fruits, comprising means for expressing oils from the rind thereof, and pneumatic means for recovering the expressed oil.

15. A machine for recovering oils from citrus fruits, comprising means for expressing oil from the rind thereof, and means for creating a current of air around the fruit for carrying off the expressed oil.

16. A machine for recovering oils from citrus fruits, comprising means for expressing oil from the rind thereof, and means for creating currents of air over and down around the fruit for carrying off the expressed oil.

17. A machine for recovering oils from citrus fruits, comprising means for expressing oil from the unremoved rind thereof, and means coöperating with said expressing means for recovering the expressed oil.

18. A machine for recovering oils from citrus fruits, comprising means for expressing oil from the rind thereof, a condenser, and means for conducting the expressed oil to the condenser.

19. A machine for recovering oils from citrus fruits, comprising means for expressing oil from the rind thereof, a condenser, and pneumatic means for conducting the expressed oil to the condenser.

20. A machine for recovering oils from citrus fruits, comprising means for expressing oil from the rind thereof, a separator, and pneumatic means for conducting the expressed oil to said separator.

21. A machine for recovering oils from citrus fruits, comprising means for expressing oil from the rind thereof, a condenser, a separator, and pneumatic means for conducting the expressed oil to said condenser and separator.

22. A machine for recovering oils from citrus fruits, comprising means for expressing oil from the rind thereof, a condenser, a separator, pneumatic means for conducting the expressed oil to said condenser and separator, and means for causing water to circulate around said condenser and separator.

23. A machine for recovering oils from citrus fruits, comprising means for supporting the fruit, a presser foot engaging the surface of the fruit and movable circumferentially thereof to compress the rind, and means for holding the fruit against rotation during the compressing movement of said presser foot.

24. A machine for recovering oils from citrus fruits, comprising means for supporting the fruit, a presser foot engaging the surface of the fruit and movable circumferentially thereof to compress the rind, means for holding the fruit against rotation during the compressing movement of said presser foot, and means for giving said presser foot a partial compressing stroke and then a full stroke.

25. A machine for recovering oils from citrus fruits, comprising means for supporting the fruit, a presser foot engaging the surface of the fruit and movable circumferentially thereof to compress the rind, means for holding the fruit against rotation during the compressing movement of said presser foot, a swinging arm connected with said presser foot for moving the same circumferentially, and a cam for actuating said arm.

26. A machine for recovering oils from citrus fruits, comprising means for supporting the fruit, a presser foot engaging the surface of the fruit and movable circumferentially thereof to compress the rind, means for holding the fruit against rotation during the compressing movement of said presser foot, a swinging arm connected with said presser foot for moving the same circumferentially, and a cam operating to move said arm to give said presser foot a partial stroke and then a full stroke.

27. A machine for recovering oils from citrus fruits, comprising means for rotatably supporting the fruit, a presser foot having means for positively engaging the rind thereof, said presser foot being movable circumferentially in either direction from its normal position, means for holding the fruit against rotation and coöperating with said presser foot on the compressing stroke thereof to compress the rind circumferentially, means for actuating said presser foot to rotate the fruit, and means for releasing the fruit to permit its rotation during the latter operation of said presser foot.

28. A machine for recovering oils from citrus fruits, comprising means for supporting the fruit, a presser foot having a plurality of needles adapted to penetrate the rind, and means for moving said needles into or out of operative position.

29. A machine for recovering oils from citrus fruits, comprising means for supporting the fruit, and a presser foot adapted to engage the fruit and having a plurality of rasp teeth on its under surface.

30. A machine for recovering oils from citrus fruits, comprising means for supporting the fruit, a presser foot adapted to engage the fruit and having a plurality of rasp teeth on its under surface, a plurality of needles carried by said presser foot, and means for moving said needles into or out of operative position.

31. A machine for recovering oils from citrus fruits, comprising means for supporting the fruit, a pair of co-acting presser feet adapted to engage the fruit, one of said presser feet being movable into and out of engagement with the fruit, and the other presser foot being movable circumferentially, and means for actuating the latter presser foot to compress the rind of the fruit circumferentially.

32. A machine for recovering oils from citrus fruits, comprising means for supporting the fruit, a pair of co-acting presser feet adapted to engage the fruit, one of said presser feet being movable into and out of engagement with the fruit, and the other presser foot being movable circumferentially, means for moving the former presser foot into and out of operative position, and means for moving the other presser foot circumferentially to compress the rind.

33. A machine for recovering oils from citrus fruits, comprising means for supporting the fruit, a pair of co-acting presser feet adapted to engage the fruit, one of said presser feet being movable into and out of engagement with the fruit, and the other presser foot being movable circumferentially, means for moving the latter presser foot circumferentially, and means for holding the former presser foot against the fruit during one movement of the circumferentially-moving foot in order to compress the rind and thereafter holding it away from the fruit during another movement of the circumferentially-moving foot in order to effect a rotation of the fruit.

34. A machine for recovering oils from citrus fruits, comprising means for supporting the fruit, presser feet adapted to engage the rind thereof, one of said presser feet being movable toward and from the fruit, cam operated mechanism for so moving said presser foot, the other presser foot being movable circumferentially, and cam operated mechanism for so moving the latter presser foot.

35. A machine for recovering oils from citrus fruits, comprising means for supporting the fruit, presser feet adapted to engage the rind thereof, one of said presser feet being movable toward and from the fruit, cam operated mechanism for so moving said presser foot, the other presser foot being movable circumferentially, cam operated mechanism for so moving the latter presser foot, needles carried by said presser feet and adapted to be projected to engage the rind, and means for projecting or retracting said needles.

36. A machine for recovering oils from citrus fruits, comprising means for supporting the fruit, expressing devices for expressing oil from the rind thereof, a condenser, a suction pipe leading from said expressing devices to said condenser, and means for maintaining a flow of air through said suction pipe.

37. A machine for recovering oils from citrus fruits, comprising means for supporting the fruit, expressing devices for expressing oil from the rind thereof, a condenser having a tortuous passage, a suction pipe leading from said expressing devices to said condenser, means for maintaining a flow of air through said suction pipe, and means for cooling said condenser.

38. A machine for recovering oils from citrus fruits, comprising means for supporting the fruit, expressing devices for expressing oil from the rind thereof, a condenser, a suction pipe leading from said expressing devices to said condenser, a separator connected with said condenser, and means for maintaining a flow of air through said suction pipe.

39. A machine for recovering oils from citrus fruits, comprising means for supporting the fruit, expressing devices for expressing oil from the rind thereof, a condenser having a tortuous passage, a suction pipe leading from said expressing devices to said condenser, a separator connected with said condenser, means for maintaining a flow of air through said suction pipe, and means for cooling said condenser.

LEWIS C. RICE.